Aug. 13, 1940.  P. S. SINCLAIR  2,211,081
DANDY ROLL AND CYLINDER MOLD
Original Filed April 13, 1936   2 Sheets-Sheet 1
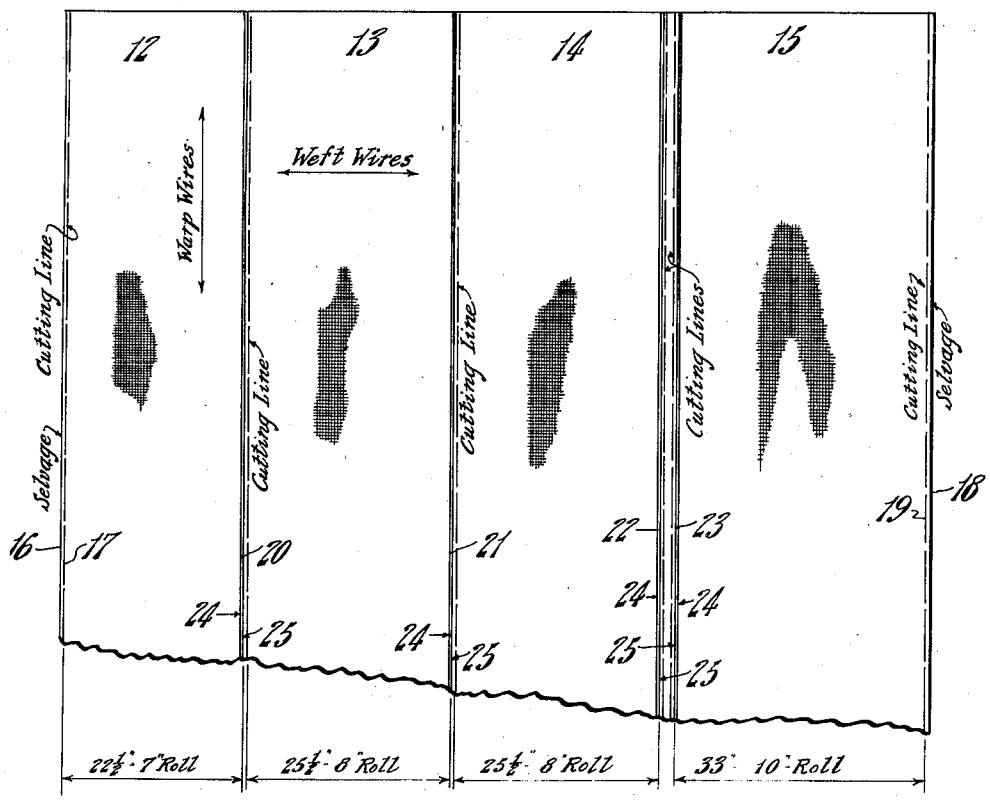
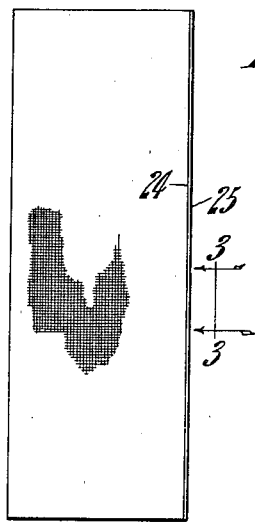
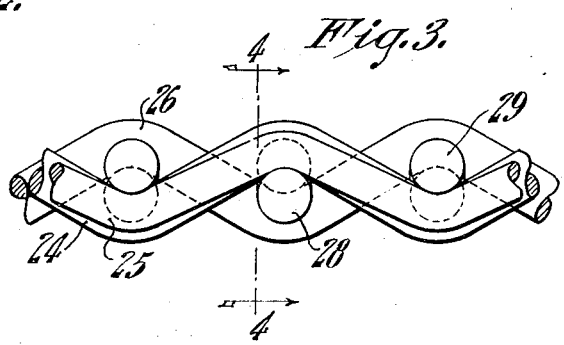
INVENTOR,
Peter S. Sinclair,
BY Frank E. Haskell
ATTORNEY.

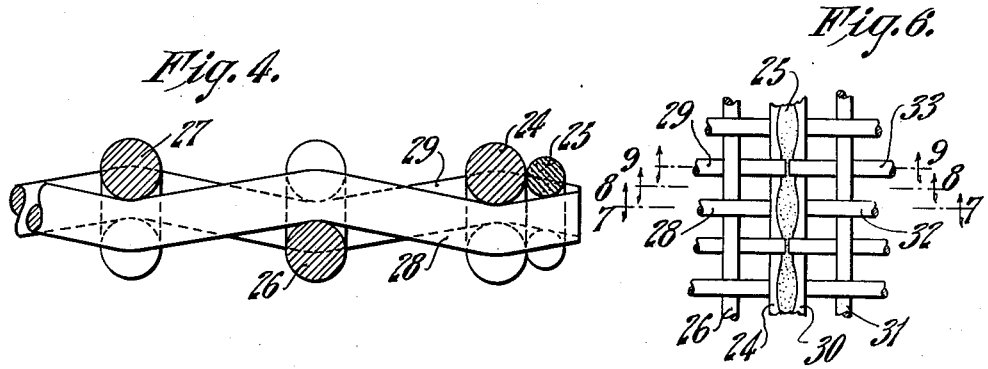
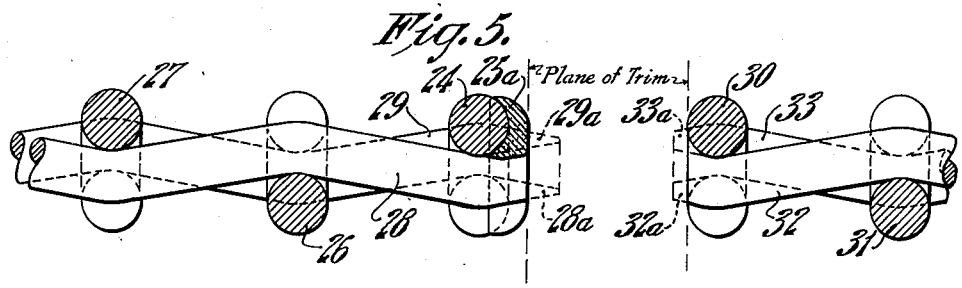
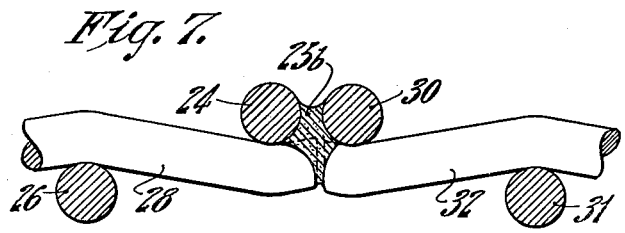
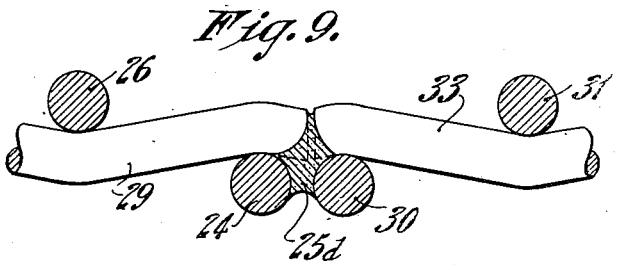
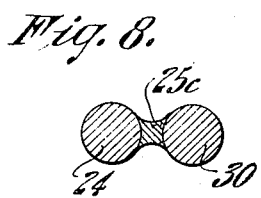

Patented Aug. 13, 1940

2,211,081

UNITED STATES PATENT OFFICE 2,211,081

DANDY ROLL AND CYLINDER MOLD

Peter S. Sinclair, Holyoke, Mass.

Application April 13, 1936, Serial No. 73,984
Renewed January 2, 1940

9 Claims. (Cl. 245—10)

Dandy rolls and cylinder molds which are used in the manufacture of paper comprise a cylindrical supporting structure around which there is placed a woven wire fabric of very fine mesh. In manufacturing such a roll it is customary to cut out a piece of woven wire fabric of the proper dimensions from a much larger piece since the amount of woven wire fabric required for one roll is much less than could be economically manufactured alone. One dimension of the piece so cut out is equal to the length of the roll and the other dimension is equal to the circumferential distance around the roll. This piece is then placed around the supporting structure with the abutting edges extending along the roll in a longitudinal direction and the edges are then joined together in a longitudinal seam. The method of producing such a seam almost universally employed until very recently has been to pass a wire back and forth across the seam so as to interlace it with two or more of the wires on each side of the seam which extend parallel thereto and thus to provide what is aptly called a sewed seam. A somewhat similar seam for Fourdrinier wires has been produced recently by means of soldering or brazing and still more recently a soldered or brazed seam has been produced in dandy rolls and cylinder molds. While both words, soldered and brazed, have just been used, it is to be understood that throughout both specification and claims the word solder, when used alone, is intended to include both soldered and brazed seams.

It is to this latter type of soldered seam, as distinguished from the older type of sewed seam, that the improvements of the present invention relate. The wire fabric itself comprises two sets of wires, one set being the longitudinal or warp wires, and another set of wires extending at right angles to the warp wires and known as the weft wires or shoot wires. In all suggestions made heretofore for soldering or brazing instead of sewing it has been assumed that the joint or seam would extend parallel to the weft wires with the warp wires meeting in abutting relationship. There are a number of reasons for this. One reason is that such soldered seams have gone into more extensive use with Fourdrinier wires and as a Fourdrinier belt is frequently 60 to 100 feet long it would be impractical either to build a loom as wide as 60 feet or to handle the roll of finished fabric after it had been made.

Another set of reasons arises from the fact that in the operation of weaving, the weft wires to a considerable extent retain their form or straightness while the movement of the harness which carries the warp wires produces a sort of wavy or up-and-down effect in the warp wires as they pass alternately above and below the weft wires. Both weft wires and warp wires do to some extent have an up-and-down or wavelike form in the finished fabric but it is much more pronounced in the warp wires than it is in the weft wires. Many of the suggestions that have been made for producing a soldered seam instead of a sewed seam involve the removal of the weft wire which extends parallel to the edge to be soldered and closest to it and the insertion of a special solder-coated wire or some other special form of wire preparatory to the making of the soldered seam. As compared with the relatively straight weft wire the removal of the wavy warp wire and the insertion of another wire in its place would be enormously difficult.

There are situations, however, where it has been found very advantageous to have the warp wires rather than the weft wires extend parallel to the seam. One of these reasons relates particularly to dandy rolls of considerable length. If the widest loom of a certain manufacturer is 176 inches wide and an order is received for a dandy roll 200 inches wide it is clear that if the seam is to extend weftwise the wire fabric would have to be purchased elsewhere. Moreover the very long dandy rolls occur so relatively infrequently and the total amount of such fabric which is required is so small that even those manufacturers who have such looms prefer to use them for other types of production. It has become standard practice therefore to cut the desired piece from a narrow fabric in the other direction since the circumferential dimension of the roll is much less than the width.

Aside from those dandy rolls which are so long that the wire fabric is never used with the seam extending weftwise, the shorter dandy rolls also are sometimes constructed with a warpwise seam. There are numerous occasions where it might be possible to order a dandy roll fabric from another manufacturer or to weave such a fabric with some delay but because of the small amount required and the delay involved it seems more practical to cut out a piece from a narrower fabric already in stock for a seam extending warpwise. The possibility that the particular woven wire fabric desired is not in stock is increased considerably due to the fact that there are some 20 different standard mesh spacings in which such wire is woven and also some 4 different alloys used for weaving such fabrics.

There is also another reason which makes it desirable to place the fabric around the supporting structure of a cylinder mold so that the seam extends warpwise. While this is not generally true there are nevertheless certain conditions under which paper manufacturers prefer to have the weft wires positioned circumferentially and the warp wires positioned parallel to the axis of the cylinder mold because under such special conditions there is improved operation.

However, regardless of the reason for which such a type of construction is selected in the first place, because of the greater difficulty of making a soldered seam in such a warpwise disposition of the fabric, sewing rather than soldering has been employed exclusively in such cases.

It is one of the objects of the present invention to provide a type of construction for a soldered seam extending warpwise which will avoid difficulties which have been encountered heretofore and to employ a process for making such a seam which will be superior to methods attempted heretofore.

Another feature associated with the great variety in lengths in which dandy rolls are constructed is the large amount of waste involved because of material left over from the cutting which cannot be used. This waste occurs to a large extent whether the pieces are cut out for warpwise seams or weftwise seams.

It is therefore another object of the invention to reduce the waste heretofore commonly associated with cutting out suitable pieces for covering dandy rolls for a large variety of lengths and a few standard diameters. The large number of widths of fabric which it would be necessary to provide to take care of all lengths of dandy rolls may be realized in considering that such rolls vary in gradations of only an inch or so from the shortest to the longest. On the other hand there are only a few diameters, about 6 in all, such as 7, 8, 10, 12, 14 and 16 inches, for which it is necessary to weave the fabric when it is the circumferential distance around the roll which is used as the standard.

More specifically it is an object of the invention to accomplish the first purpose by weaving a soldering element warpwise into the woven wire fabric and thus obviate the necessity of removing one of the wavy warp wires and inserting a special soldering element in the wavy warpwise position thus left for it.

Still more specifically it is an object of the invention to weave into the fabric alongside one of the warp wires a wire of somewhat smaller diameter and of a material suitable for producing a brazed or soldered joint such for example as a hard silver solder.

It is more specifically an object of the invention to reduce waste, as stated generally to be an object of the invention, by weaving into the fabric a plurality of soldering elements at different spaced intervals whereby a plurality of widths of warpwise extending fabrics may be obtained, each width suitable for extending around a dandy roll of a certain diameter. In other words the fabric is standardized in a few standard widths adapted to take care of a relatively few standard diameters of dandy rolls rather than in attempting to provide for a certain number of different lengths of dandy rolls which are subject to much greater variation than the diameters.

The foregoing and other objects of the invention will readily appear to those skilled in the art to which it appertains by a consideration of the following description of one embodiment thereof taken in connection with the accompanying drawings in which Fig. 1 is a more or less diagrammatic plan view, to a greatly reduced scale, of a wire fabric embodying the principles of the invention;

Fig. 2 is a similar plan view of one section of the fabric shown in Fig. 1 after it has been separated from the other sections;

Fig. 3 is an elevation taken to a greatly enlarged scale of a small portion of the fabric shown in Fig. 2, looking in the direction of the arrows 3—3 of Fig. 2;

Fig. 4 is a section taken on the line 4—4 of Fig. 3 and shows the ends of the weft wires trimmed off preparatory to heating the special element;

Fig. 5 is a view similar to Fig. 4 but shows the appearance of the special element after heat has been applied thereto and with the opposed edge to be joined thereto shown at the right of the figure;

Fig. 6 is a top plan view of the fabric showing the appearance of the joint after the edges have been placed in juxtaposition and heat applied for completing the soldered joint;

Fig. 7 is a section taken on the line 7—7 of Fig. 6 and shows the appearance of the soldered joint at a weft wire where the warp wires are positioned above said weft wire;

Fig. 8 is a section taken on the line 8—8 of Fig. 6 and shows the appearance of the joint midway between weft wires; and Fig. 9 is a section taken on the line 9—9 of Fig. 6 and shows the appearance of the joint at a weft wire where the warp wires are positioned below said weft wire.

Referring to the drawings more in detail the reference character 11 indicates a woven wire fabric shown as divided into four sections 12, 13, 14 and 15 by means of special elements for soldering which elements will be presently described more in detail. The left hand edge 16 of the fabric is not adapted for use for a slight distance back away from the edge and is known as the selvage. A cutting line is indicated at 17 and the space allowed between the edge 16 and the cutting line 17, which is wasted, is known as the trim. There is a similar trim between the right hand edge 18 and a cutting line 19. The special element for soldering which separates the section 12 and the section 13 is indicated at 20, that between section 14 and section 15 is indicated at 21, and between the sections 14 and 15 there are provided two such special elements 22 and 23.

The particular form of the special element which is used for soldering is shown in the drawings as comprising two parts, one part being the longitudinally extending or warp wire 24 and the other part being a wire of hard silver solder 25 of a diameter smaller than that of the warp wire, the size of the wire of solder as shown being about two-thirds of the size of the warp wire. It is obvious that this soldering element may be of various forms either of separate wires or of some modification in which the wire that is not solder is combined with the solder as a single unit prior to its being woven into the fabric. The weaving in of a single wire of solder alongside a warp wire, however, without any previous processing of them either separately or together, has the factor of extreme simplicity to recommend it. Moreover there are several other advantages associated with the specific form of construction just described. In the first place the solder 25 is concentrated nearer the edge of the fabric (see Fig. 4) than would be the case if, for example, the solder were used as a sheath around one of the ordinary warp wires as a core. This position near the edge is where the solder is needed and where it is used in making the soldered seam as will more fully appear in the description of the process of making the seam. The feature of making the wire 25 somewhat smaller than the wire 24 has at least two advantages. If the two adjacent wires are each of the same diameter as the other warp wires the fabric at this point is too bulgy. By making the wire of solder slightly smaller than its adjacent wire it is possible for it to fit within the natural curvature of the weft wire without changing such curvature to any substantial degree. In the second place there is a tendency for a warp wire of solder of this smaller diameter to press more tightly against the weft wire each time it crosses such weft wire and in the subsequent soldering operation to form a more perfect union with the ends of the weft wires. This can best be seen in Fig. 3 where the warp wire 24 and the wire of solder 25, which together constitute the element for soldering, are shown to a greatly enlarged scale. Positioned behind the special element is shown the other warp wires 26 and 27. (See also Figs. 4 and 5.) The numerals 28 and 29 indicate weft wires.

While suggestions have been made heretofore for weaving into such a wire fabric a special element for soldering or brazing, such suggestions have always had to do with a special weftwise element and never until the present invention has anyone accomplished satisfactory results with a warpwise special element although as now accomplished there are at least three distinct advantages obtained thereby. To weave in a special soldering element as a weft wire at certain intervals, such as every 22½ inches for example, requires a great deal more care and attention than is required for the warpwise element of the present invention which requires no further attention once the weaving operation has begun. Secondly, the preliminary heating of the special element, as described hereinafter in connection with the process, may be done while the fabric is in its full warp length and may therefore be done by machine and done more rapidly, economically and satisfactorily in every way. Finally as will be described in connection with the process it is only one side of the seam which is given a special construction. The other side of the seam being of the usual construction, that is, the same construction as the rest of the fabric, may be trimmed back as required when in position on the dandy roll without the necessity of preparing both edges separated by just the right width of fabric to fit around the cylinder. Those processes which prepare both edges make it imperative, as a practical matter, to prepare at least one edge when in position on the dandy roll, since dandy rolls do vary slightly in diameter even when they are nominally of the same diameter. In such processes one special element may be woven into the fabric but the other would have to be prepared in place on the roll.

The method of producing a soldered seam with the type of construction shown may be briefly described as follows. The ends, 28a and 29a, of the weft wires are trimmed back fairly close to the element 24—25, that is, to the solder wire 25 as shown in Fig. 4. The edge of the fabric is then heated moderately by some suitable means which causes the solder to flow back against and partly around the warp wire 24, adhering thereto and producing a more or less unitary soldering element or duplex wire, leaving the ends of the weft wires 28a and 29a projecting a slight distance beyond the edge of the fabric as shown in dotted lines in Fig. 5. The next step in the process of making the soldered seam is the cutting off or grinding off the projecting ends 28a and 29a of the weft wires to the same vertical plane as the edge of the solder as indicated on the drawing by the legend "plane of trim." In Fig. 5 there is shown at the right of the figure the edge of the fabric to which is to be joined the soldering element, including the warp wire 24 and solder 25, and also the ends of the weft wires 28, 29, etc. The similar opposed warp wires are indicated by the reference characters 30 and 31 and the weft wires by the numerals 32 and 33 the ends of which project slightly beyond the warp wire 30 as shown in dotted lines at 32a and 33a. These projecting ends like the ends 28a and 29a at the other side of the seam are ground off or cut off to the same vertical plane as the side of the warp wire 30. The opposed edges of the fabric are then brought close together and heat again applied to the solder. Under the action of such heat the two edges of the seam are brazed or soldered together, the appearance of the seam in looking down upon it being somewhat as shown in Fig. 6. A section taken across the joint where the element for soldering is positioned above the wire is shown in Fig. 7, the solder 25b joining the parallel warp wires 24 and 30 and the ends of weft wires 28, 32, etc.; a similar section midway between weft wires is shown in Fig. 8, the solder 25c joining the parallel warp wires 24 and 30; and a section where the element for soldering is positioned below the weft wires is shown in Fig. 9, the solder 25d joining the parallel warp wires 24 and 30 and the ends of the weft wires 29, 33, etc.

It will be noted that section 12 is of a suitable width for a 7" dandy roll or about 22½ inches wide, sections 13 and 14 for an 8" dandy roll or about 25½ inches wide, and section 15 for a 10" dandy roll or about 33 inches wide. In other words a wire fabric having a total width a little over 106½ inches (enough over to allow for the different trims) is capable of providing four separate rolls of dandy-roll wire. Each roll has the proper width for the roll for which it was designed and may be cut off in pieces from time to time to cover different rolls from the very shortest length to the very longest without any waste whatever.

While there are various ways in which the element may be introduced into the fabric warpwise one or two of these ways will be described more in detail inasmuch as there are certain specific advantages which follow therefrom. In one of these ways, when the warp wires are being threaded through the eyes of the heddle, the warp wire 27 may be threaded through one of the eyes of the upper frame of the heddle, the warp wire 26 through one of the eyes of the lower frame of the heddle, the warp wire 24 through the next adjacent eye of the upper frame of the heddle, and the wire of solder through the next adjacent eye of the same upper frame of the heddle. The next warp wire, not shown in the drawings, is passed through the next adjacent eye of the lower frame of the heddle and thereafter through the upper and lower frames alternately. It will thus be seen that the special element, comprising the wires 24 and 25, occupies a space in the heddle equivalent to two of the other warp wires. A second method is to place both of the wires 24 and 25 in the same eye of the heddle and leave the next adjacent eye unoccupied. The manner in which the warp wires are carried through the dents in the reed also influences and controls the relative disposition of the usual warp wires with respect to the special element. Preferably the two wires 24 and 25 of the special element are carried through the same dent which is the dent adjacent to the one through which the warp wire 26 is carried. The dent next to the solder 25 is left unoccupied so that there is a tendency for the special element to take up a position a little farther away from the warp wire 26 than the distance which separates the other warp wires from each other. This extra spacing produces a slightly larger mesh and counteracts to some extent the extra obstruction offered by the doubling up of the warp wires 24 and 30 at the seam. An alternative construction is to position the warp wires throughout the full width of the fabric in the same heddle frames and in the same dents of the reed as though there were to be no special soldering elements and to position the wires of solder alongside the selected warp wires in the same eyes of the heddle frames and in the same dents of the reed so that there is no difference between the spacings of the special elements and of the other warp wires. Each of the special elements may therefore be used to replace either one warp wire or more than one warp wire although the latter is deemed to be the preferable construction.

It is to be understood that the foregoing embodiment of the invention has been selected for purposes of illustration only and that various changes may be made therein without departing from the spirit and scope of the invention as defined in the subjoined claims.

I claim:

1. In a woven-wire-covered cylindrical supporting structure for use in paper manufacture, a woven wire fabric having a set of warp wires and a set of weft wires positioned around said structure with one set of wires extending circumferentially and the other set of wires extending longitudinally, the opposed edges of said fabric being united in a longitudinal seam comprising at one side thereof and parallel thereto a woven-in special element, a portion of said special element being a warp wire and a portion of said special element being solder, and said seam comprising at the other side thereof a warp wire extending parallel to the warp wire of said special element and joined thereto by said solder.

2. In a dandy roll or cylinder mold, a woven wire covering therefor having a set of weft wires extending circumferentially of the roll and a set of warp wires extending longitudinally of the roll, the opposed edges of the woven wire being united in a longitudinal soldered seam comprising at one side thereof a woven-in warp wire with a woven-in wire of solder adjacent thereto, said solder being positioned between said warp wire and the edge of the fabric, and said seam comprising at the other side thereof a warp wire extending parallel and adjacent to said first-named warp wire and united thereto by means of said solder.

3. In a dandy roll or cylinder mold, a woven wire covering therefor having a set of weft wires extending circumferentially of the roll and a set of warp wires extending longitudinally of the roll, the opposed edges of the woven wire being united in a longitudinal soldered seam comprising at one side thereof a woven-in warp wire with a woven-in wire of solder adjacent thereto, said solder being positioned between said warp wire and the edge of the fabric, and said seam comprising at the other side thereof a warp wire extending parallel and adjacent to said first-named warp wire and united thereto by means of said solder, said woven-in warp wire and said woven-in wire of solder being woven into the wire covering a slightly greater distance from the next adjacent warp wire than the distance between the other warp wires to provide greater drainage to offset the double breadth of warp wires at the seam.

4. A woven wire fabric for covering cylindrical supporting structures used in paper manufacture comprising a set of warp wires extending in one direction, a set of weft wires extending at right angles thereto, and a plurality of special elements woven into said fabric parallel to said warp wires, the distance between each adjacent pair of special elements corresponding to the circumferential distance around a supporting structure to be covered by said fabric, a portion of each special element comprising material of substantially the same size and strength as said warp wires and another portion comprising solder for uniting said element with an opposed edge of said fabric.

5. A woven wire fabric for covering cylindrical supporting structures used in paper manufacture comprising a set of warp wires extending in one direction, a set of weft wires extending at right angles thereto, and a plurality of wires of solder of slightly smaller diameter than said warp wires woven into said fabric each adjacent to one of the warp wires, said wires of solder being spaced at a distance from each other corresponding to the circumferential distance around a supporting structure to be covered by said fabric.

6. The process of covering a cylindrical supporting structure with a woven wire fabric for use in paper manufacture comprising weaving into a woven wire fabric having warp wires and weft wires a wire of solder adjacent to one of the warp wires, cutting off the weft wires adjacent to the wire of solder, heating the edge of the fabric to cause the wire of solder to melt and adhere to the ends of the weft wires and to the adjacent warp wire in the form of a duplex wire, trimming off the ends of the weft wires substantially flush with the solder side of said duplex wire, positioning the fabric around the supporting structure with the adjacent edges of the fabric extending longitudinally thereof and with the duplex wire extending along one edge, trimming off the ends of the weft wires on the opposite edge of the fabric substantially flush with one of the warp wires, tensioning the fabric around the supporting structure and bringing the duplex wire and the opposed warp wire into juxtaposition, and heating the duplex wire to cause it to melt and adhere to the ends of the weft wires and to the warp wire of the other edge of the fabric with which it is in contact.

7. The process of covering a cylindrical supporting structure with a woven wire fabric for use in paper manufacture comprising weaving into a woven wire fabric having warp wires and weft wires a special element in the same direction as the warp wires, a portion of said element being of the same material as the other warp wires and a portion of solder, trimming off the ends of the weft wires substantially flush with said special element, positioning the fabric around the supporting structure with the adjacent edges of the fabric extending longitudinally thereof and said special element extending along one edge, trimming off the ends of the weft wires on the opposite edge of the fabric substantially flush with one of the warp wires, tensioning the fabric around the supporting structure to bring the special element and the opposed warp wire into juxtaposition, and heating the special element to cause it to melt and adhere to said juxtaposed warp wire and to the ends of the weft wires on both sides of the seam.

8. The process of weaving a wire fabric for covering a cylindrical supporting structure for use in paper manufacture, comprising placing the warp wires alternately in different heddle frames with two of the adjacent warp wires in the same frame, one of said two adjacent warp wires being of the same material as the other warp wires and the other of said two adjacent warp wires being of solder, and weaving said two warp wires into the wire fabric as one wire so as to occupy a space weftwise of the fabric equivalent to two of the other warp wires.

9. The process of weaving a wire fabric for covering a cylindrical supporting structure for use in paper manufacture, comprising placing the warp wires alternately in different heddle frames with two of the adjacent warp wires in the same frame, one of said two adjacent warp wires being of the same material as the other warp wires and the other of said two adjacent warp wires being of solder, placing said two adjacent wires in the same dent of the reed while leaving an adjacent dent vacant, and weaving said two adjacent wires into the fabric as one wire so as to occupy a space weftwise of the fabric equal to the space occupied by two of the usual warp wires.

PETER S. SINCLAIR.